United States Patent Office 3,121,924
Patented Feb. 25, 1964

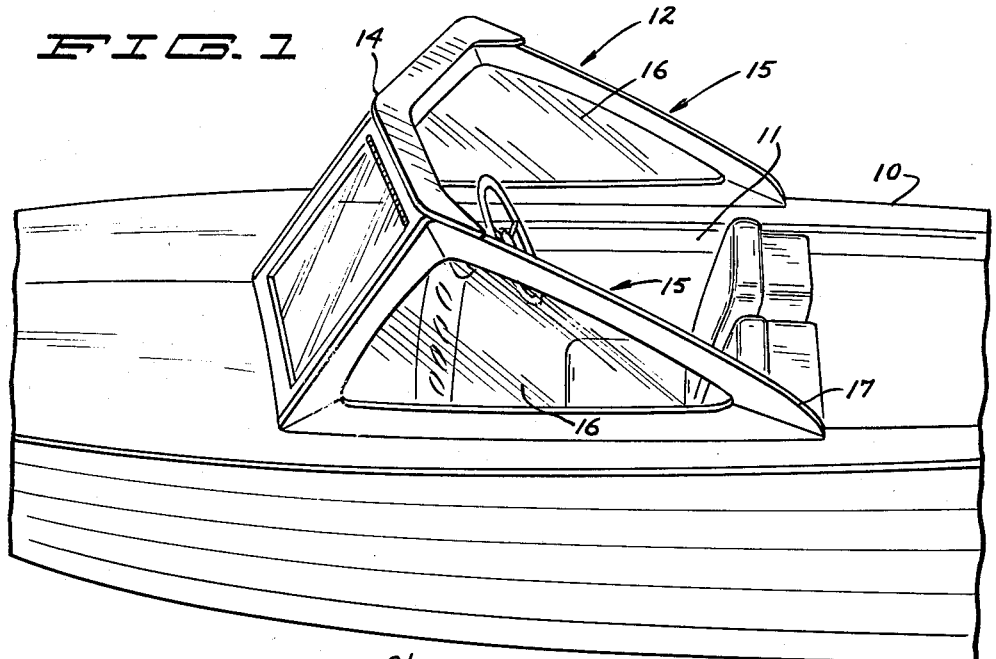
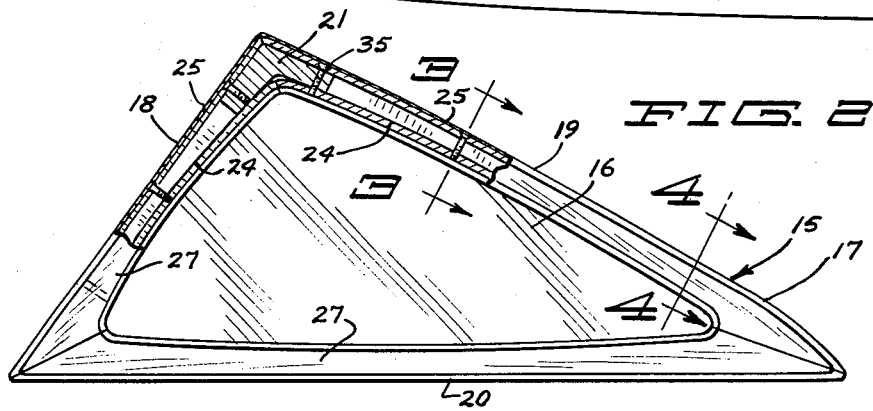
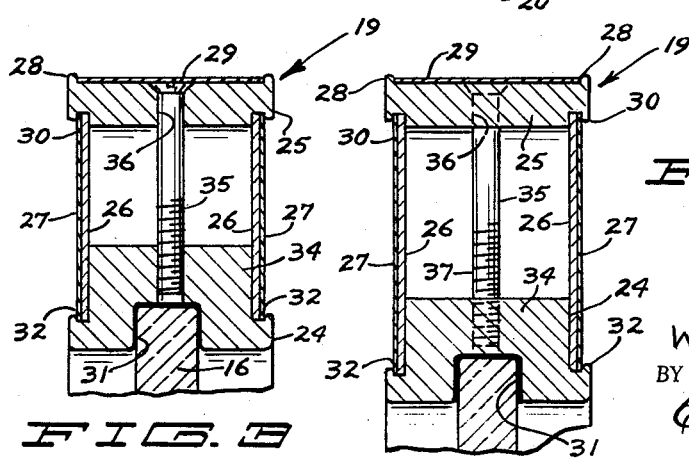

3,121,924
WINDSHIELD FRAME
Walter E. Beisel, Minneapolis, Minn., assignor to C. W. Olson Mfg. Co., Minneapolis, Minn., a corporation of Minnesota
Filed Apr. 2, 1962, Ser. No. 184,016
1 Claim. (Cl. 20—56)

This invention relates generally to windshields and particularly concerns the construction of the frame which surrounds and holds the windshield glass.

The invention is particularly useful in windshields for marine craft wherein it is desirable for reasons of strength and durability to have windshield frame members formed of metal and for aesthetic reasons to have such frame members curved or otherwise irregular in cross section throughout their longitudinal extension to give the appearance of wood, molded metal or plastic or the like.

The primary object of the invention is to provide a novel construction for a windshield metal frame section which allows the section to vary in cross sectional dimension throughout its length without resorting to casting or machining operations in the manufacture thereof.

Another object of the invention is to provide a novel windshield frame construction in which the frame is constructed of metal but yet which gives an outward appearance that it is constructed of wood.

With these and other objects in view the invention broadly comprises a windshield frame section in which a pair of rigid bars extend along a common plane with the spacing therebetween gradually varying along their longitudinal extension, a pair of coextensive elongated strips or panels of sheet material extending in parallelism along and between the bars and respectively filling the varying spacing therebetween at both sides of the bars, and screw means connecting the bars between the panels for holding the bars firmly against the longitudinal edges of the panels so that the bars and panels jointly form an elongated section having a varying cross sectional dimension along its length. The invention is further characterized by applying wood veneer to the exterior surface of the panels and at least one of said bars to jointly with the irregular shape of the section give the impression that it is manufactured of wood.

The above mentioned and additional objects of the invention will be brought to light during the course of the following specification, reference being made to the accompanying drawing, in which—

FIG. 1 is a perspective view of a portion of a boat having a windshield with side wings constructed in accordance with the present invention.

FIG. 2 is an elevational view of one of the windshield side wings partially broken away to show the construction of the windshield frame.

FIG. 3 is a section taken through the frame along line 3—3 of FIG. 2.

FIG. 4 is a section taken through the frame long line 4—4 of FIG. 2.

Referring now more particularly to the drawing, reference characters will be used to denote like parts or structural features in the different views. FIG. 1 shows a boat 10 having the conventional operator's compartment 11 with a windshield, designated generally at 12, extending around the front and sides thereof.

The windshield has a front section 14 and a pair of side wings 15 extending rearwardly one from each side of the front section. Each side section comprises a pane 16 of transparent sheet material such as glass and a frame, designated generally at 17 peripherally encircling the pane 16. The frame 17 forms the subject of this invention and for its construction attention is directed to FIGS. 2 through 4. It is here shown as triangular with three frame sections 18, 19, and 20 interconnected as by angular corner inserts 21. While sectional views 3—3 and 4—4 are taken through the section 19, it will be understood that the sections 18 and 20 are constructed in the same manner.

Each section is formed of inner and outer bars of steel, aluminum or the like, denoted respectively at 24 and 25, held apart in spaced relation by side strips 26 of rigid sheet material. These strips 26 may have thin laminations 27 of wood sheeting cemented to their outer surfaces to give the frame a woodlike appearance.

The bar 25 has side edge ridges 28 between which a thin lamination 29 of wood may be cemented. On its underside the bar 25 is provided with parallel slots 30 for reception of the upper edges of the strips 26 and their covering sheets 27 to secure the strips against lateral displacement.

The bar 24, while equal in over-all width to the bar 25, is somewhat greater in vertical thickness. On its underside bar 24 is provided with a longitudinally extending groove 31 for reception of the peripheral edge of the pane 16. Bar 24 also has parallel upwardly opening longitudinally extending grooves 32 vertically opposing the slots or grooves 30 for the reception and retention of the inner edges of strips 26. The central portion of bar 24 projects upwardly as at 34 between the grooves 32 to serve as a partial backing for the strips 26 and to provide adequate thickness for receiving the threaded ends of screws 35 which are used to secure the bars 24 and 25 against separation. These screws 35 extend through countersunk apertures 36 in bar 25 and have threaded portions 37 threaded into aligned apertures in the thickened portion 34 of bar 24.

The bars 24 and 25 having constant cross sectional shapes may be formed by extrusion and then bent or curved to give the desired frame outline a pleasing ornamental appearance such as a carved wood effect. The side strips 26 are stamped to fit snugly within the respective bar grooves 30 and 32. The screws 35 are then inserted to tie the assembly together in a rigid frame member.

The assembled frame sections are then applied to the windowpane 16 and tied together such as by members 21.

While laminations 27 are used, they are preferably applied before assembly of the section while laminations 29 which cover the screw heads must be applied after assembly.

It will thus be seen that the construction disclosed allows ready fabrication of a window frame section which has a varying cross sectional dimension throughout its length without the need of expensive casting or machining procedures.

It is understood that suitable modifications may be made in the structure as disclosed, provided such modifications come within the spirit and scope of the appended claim. Having now therefore fully illustrated and described my invention, what I claim to be new and desire to protect by Letters Patent is:

In a windshield, a frame encircling a planar sheet of windshield glass comprising a plurality of interconnected elongated frame sections, at least one of said frame sections having a gradually varying thickness in a direction coplanar with the sheet along its length to give the appearance of a cut wood frame, said one frame section comprising in cross section in the direction of such thickness a curved inner bar having an inwardly opening channel for receiving the sheet edge, an outer bar spaced outwardly from the inner bar on the plane of the sheet, said bars having opposing pairs of straight grooves disposed one pair on each side of the plane of the sheet with each bar having one of the grooves in each pair, each pair of grooves lying in a common groove plane parallel to the plane of the sheet with the grooves in each pair opening directly toward one another on said groove plane, a pair of coextensive flat elongated side strips extending longitudinally between the bars one on each side of the plane of the sheet and each having its longitudinal edges seated in one pair of said grooves, the spacing between said bars gradually varying along their longitudinal extension due to the curvature of the inner bar to vary the spacing between said grooves in each pair, and said strips correspondingly varying in width along their longitudinal extension to completely close said spacing, and means interconnecting the bars between said strips to retain the strips in the grooves, and said last mentioned means comprising at least one headed screw having its shank extending through the outer bar and being threaded directly into the inner bar for insertion and tightening of the screw from the outside of the frame members.

References Cited in the file of this patent

UNITED STATES PATENTS

| | | |
|---|---|---|
| 1,270,014 | Conwell | June 18, 1918 |
| 1,850,439 | Yeaton | Mar. 22, 1932 |
| 2,184,553 | Johnson | Dec. 26, 1939 |

FOREIGN PATENTS

| | | |
|---|---|---|
| 973,831 | France | Sept. 20, 1950 |

OTHER REFERENCES

Perry, T.D.: "Wood-to-Metal Adhesives," Plastics (magazine), July 1947, pages 21, 22, 24, and 68 relied on.